United States Patent [19]

Barger

[11] Patent Number: 4,970,404

[45] Date of Patent: Nov. 13, 1990

[54] METHOD AND MEANS OF GENERATING ELECTRICITY BY A WIND BLOWN TURBINE

[76] Inventor: Lloyd D. Barger, 14005 Northdale Blvd., Rogers, Minn. 55374

[21] Appl. No.: 292,109

[22] Filed: Dec. 30, 1988

[51] Int. Cl.⁵ ............................................... F03D 3/00
[52] U.S. Cl. ..................................... 290/55; 416/119; 416/197 A
[58] Field of Search ............................. 290/44, 52, 55; 416/119, 197 A; 310/232

[56] References Cited

U.S. PATENT DOCUMENTS

| | | | |
|---|---|---|---|
| 3,038,138 | 6/1962 | Peterson | 310/232 X |
| 3,066,386 | 12/1962 | Filipczak | 310/232 X |
| 3,314,038 | 4/1967 | Rutten | 310/232 X |
| 3,473,038 | 10/1969 | Hakkarinen | 290/55 X |
| 4,086,023 | 4/1978 | Morgan | 416/119 X |
| 4,291,235 | 9/1981 | Bergey, Jr. et al. | 290/55 |
| 4,316,096 | 2/1982 | Syuerson | 290/44 |

Primary Examiner—A. D. Pellinen
Assistant Examiner—W. E. Duncanson, Jr.
Attorney, Agent, or Firm—Zarley, McKee, Thomte, Voorhees & Sease

[57] ABSTRACT

A method of generating electricity by a wind blown turbine comprising mounting a generator aramture rigidly on a shaft; rotatably mounting a housing, a field coil and a wind turbine with respect to the shaft; electrically connecting the field coil through brushes and a brush plate; and mounting the shaft against rotation so that when air currents rotate the wind turbine, the housing, the field coil, and the brush plate will rotate whereby electrical current generated in the field coil will be transmitted to output lines. An apparatus for generating electricity comprising an armature rigidly mounted on a shaft and a wind turbine rotatably mounted on the shaft. A housing with a field coil is mounted within the wind turbine and surrounds the armature. A brush plate with brushes electrically connects the field coil. Air currents rotate the wind turbine to cause the field coil to rotate about the armature. Electrical current generated in the field coil is transmitted through the brushes to output leads.

11 Claims, 2 Drawing Sheets

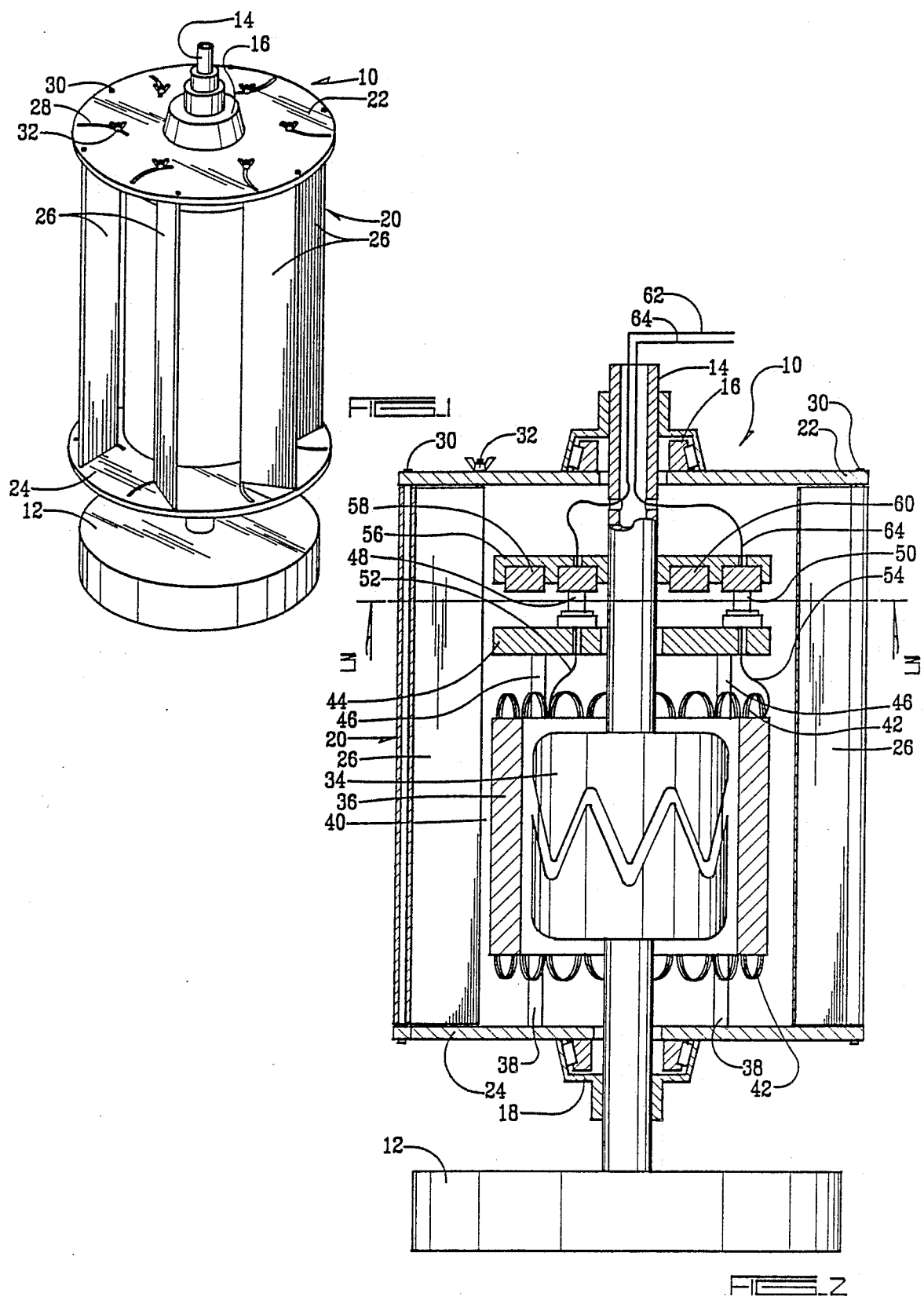

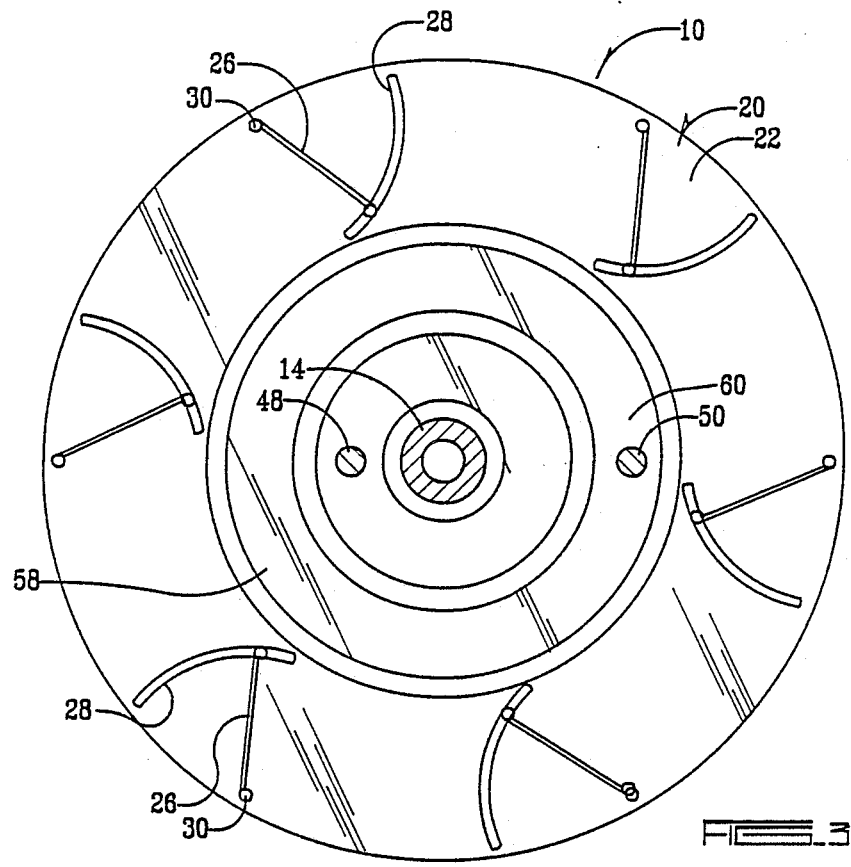

METHOD AND MEANS OF GENERATING ELECTRICITY BY A WIND BLOWN TURBINE

BRIEF OBJECTION OF THE INVENTION

Generating electricity by a wind blown means is an old art. However, the mechanical and electrical efficiencies of prior art devices has not been high. The great relative cost of most of the prior art units compared to the electrical output often makes their use economically prohibitive.

It is therefore a principal object of the invention to provide a method and means of generating electricity by a wind blown turbine which will produce a high electrical output with wind currents at even low velocities.

A further object of the invention is to provide a method and means of generating electricity by a wind blown turbine which is economical of manufacture, and which can recoup investment costs over a short period of time by reason of the production of high electrical output resulting in savings from purchased power.

A still further object of this invention is to provide method and means of generating electricity by a wind blown turbine which can accommodate both small and large power generator needs from residential requirements to heavy industrial requirements.

These and other objects will be apparent to those skilled in the art.

SUMMARY OF THE INVENTION

The method of this invention comprises generating electricity by a wind blown turbine through taking a generator armature; rigidly mounting it on a shaft; rotatably mounting a housing with respect to said shaft and positioning the housing and a field coil therein around the armature; rotatably securing a wind turbine to the shaft; rotatably securing a brush plate with brushes thereon to the shaft; electrically connecting the field coil to the brushes; rigidly securing a pickup plate with electrical contacts on the shaft with the electrical contacts in engagement with the brushes; securing output lines to the electrical contact; rigidly linking said wind turbine and said housing and said brush plate together; and mounting the shaft against rotation so that when air currents rotate the wind turbine, the housing, the field coil, and the brush plate will rotate whereby electrical current generated in the field coil will be transmitted to the output lines through the brushes and the electrical contacts.

The apparatus of this invention comprises a base member with a vertical shaft extending therefrom, and an armature rigidly mounted on the shaft. A wind turbine is rotatably mounted on the shaft and comprises an upper plate, a lower plate, and a plurality of vanes extending therebetween. A housing is mounted within the wind turbine and surrounds the armature. A field coil is imposed on the housing. A brush plate with brush elements thereon is fixedly mounted on the housing. The brush elements are in contact with a pickup plate having two electrical contact rings thereon with the pickup plate being rigidly secured to the shaft. Electrical leads connect the field coil to each of the brush elements, and outlet leads are connected to each of the electrical contact rings on the pickup plate. Air currents are adapted to rotate the wind turbine to cause the field coil to rotate about the armature wherein electrical current in the field coil is transmitted to the brush elements and thence the electrical contact rings on the pickup plate, and thence to the outlet leads.

BRIEF DESCRIPTION OF THE DRAWINGS

FIG. 1 is a perspective view of the generator of this invention;

FIG. 2 is an enlarged vertical sectional view thereof; and

FIG. 3 is a sectional view taken on line 3—3 of FIG. 2.

DESCRIPTION OF THE PREFERRED EMBODIMENT

The generator 10 consists of a support base 12 having a vertical shaft 14 rigidly secured thereto in any convenient means. While shaft 14 is preferred to be disposed in a vertical position, it could also be disposed in a non-vertical position without substantially departing from the principle of this invention.

Spaced apart bearings 16 and 18 are mounted by any convenient means on shaft 14 and are adapted to rotatably secure wind turbine 20 to shaft 14. Wind turbine 20 is comprised of an upper horizontal plate 22, and a lower plate 24 with a plurality of vanes 26 extending therebetween. The vanes can be either of a flat or curved construction. The vanes have one edge pivoted to the plates 22 and 24 at 30, and wing nut and screw assemblies 32 extending through slots 28 permit the attitude of the vanes to be selectively adjusted in the slots 28.

As shown in FIG. 2, an armature 34 is rigidly secured to shaft 14. Housing 36 surrounds armature 34 and is supported by rods 38 which extend upwardly from plate 24. The space between housing 36 and armature 34 is designated by the numeral 40. A field coil of conventional construction is imposed either in or on housing 36 to surround armature 34.

A horizontal brush plate 44 of nonconductive material is rigidly secured to housing 36 by support rods 46. Conventional brush elements or contacts 48 and 50 are mounted on brush plate 44 and are connected to field coil 42 by leads 52 and 54, respectively.

A pickup plate 56 of nonelectrical conducting material is rigidly secured by any convenient means to shaft 14. Concentrically disposed spaced apart electrical contact rings 58 and 60 are imposed on or in pickup plate 56. Rings 58 and 60 engage the brush elements 50 and 48, respectively. Outlet leads 62 and 64 are electrically connected to each of the rings 60 and 58, respectively.

In operation, the attitude of vanes 26 are selectively adjusted on plates 22 and 24 to either best take advantage of existing winds, or to be adjusted to a desired pitch to accommodate average wind conditions. Air currents cause the wind turbine 20 to rotate on bearings 16 and 18. This rotational movement of wind turbine 20 also causes housing 36, field coil 42, and brush plate 44 to rotate in unison with the wind turbine. The movement of the field coil 42 around armature 34 induces electrical current in the field coil by conventional means. The induced electrical current in the field coil passes through leads 52 and 54 to brushes 48 and 50, respectively. The current then passes from brushes 48 and 50 into conductive rings 60 and 58, respectively. The current then passes from the rings 58 and 60 to the leads 64 and 62, respectively, to any suitable electrical outlet.

By incorporating the field coil in the wind turbine to rotate about a fixed armature, the need for belts, gears, or the like to transmit rotational power from a turbine to a generator is eliminated. Further, the housing 36 and field coil 42, along with brush plate 44 create a flywheel effect in the wind turbine which further adds to the efficiency of the device.

This invention permits the creation of a method and means of generating electricity which is extremely economical and which is well adapted for the relatively small electrical consumer, but which can be magnified in size to also efficiently produce electricity for heavy electrical usage. It is, therefore, seen that this invention will accomplish at least all of its stated objectives.

I claim:

1. The method of generating electricity by a wind blown turbine, comprising, taking an electrical generator having a housing with an elongated drive shaft means in said housing and extending from said housing in at least one direction, an armature in said housing secured to said shaft, a field coil in said housing in spaced relation to said armature, and a bearing means between said shaft and said housing to permit relative rotational movement therebetween, rotatably mounting a brush plate with brushes thereon on said shaft outside said housing, rigidly mounting a pickup plate with electrical contacts on said shaft adjacent said brush plate so that said brushes are in slidable contact with said electrical contacts, taking a wind turbine having a rotational axis and aligning said axis with said shaft, rigidly linking said wind turbine, said housing, and said brush plate together so that they can rotate together in unison about the same axis when air currents engage said wind turbine and cause it to rotate, holding said shaft against rotation, electrically connecting said field coil with said brushes, electrically connecting said electrical contacts to electrical output lines, and rotatably mounting said wind turbine on a support means, whereby air currents rotating said wind turbine will cause said housing and said field coil to rotate about said armature to generate an electrical current in said field coil, and whereupon said electrical current will be transmitted to said electrical output lines through said brushes, and through said electrical contacts on said pickup plate.

2. The method of claim 1 wherein said wind turbine is positioned to rotate about a substantially vertical axis.

3. A wind generated electrical device comprising, an electrical generator means having a housing, a power shaft in rotatably mounted in said housing and having at least one end extending therefrom, an armature rigidly secured to said shaft within said housing, a field coil in said housing in spaced relationship to said armature, a brush plate rotatably mounted on said shaft outside said housing, brush elements on said brush plate electrically connected to said field coil, a pickup plate rigidly secured to said shaft adjacent said brush plates, electrical contacts on said pickup plate in contact with said brush elements, electrical output lines connected to said electrical contacts, a support base, a wind turbine rotatably mounted on said base and having a rotational axis, means connected to said shaft to hold said shaft against rotation, rigid linking means rigidly connecting said wind turbine, said housing, and said brush plate so that they will rotate about the same axis in unison on said base when air currents engage said wind turbine, whereupon air currents rotating said wind turbine will cause said housing and said field coil to rotate about said armature to generate an electrical current in said field coil, and whereupon said electrical current will be transmitted to said electrical output lines through said brushes, and through said electrical contacts on said pickup plate.

4. The device of claim 3 wherein said wind turbine rotates about a substantially vertical axis.

5. The device of claim 3 wherein said generator means is mounted within said wind turbine.

6. The device of claim 3 wherein said generator means, said brush plate, and said pickup plate are mounted within said wind turbine.

7. The device of claim 4 wherein said wind turbine has upper and lower ends, bearing means on said upper and lower ends, said shaft extending from said housing in opposite directions and extending through said bearing means to rotatably support said wind turbine.

8. The device of claim 7 wherein said generator means is mounted within said wind turbine.

9. The device of claim 7 wherein said generator means, said brush plate, and said pickup plate are mounted within said wind turbine.

10. The device of claim 1 wherein said electrical contact elements are concentrically spaced conductive rings in said pickup plate.

11. The method of generating electricity by a wind blown turbine, comprising, taking a generator armature and mounting it on a shaft, rotatably mounting a housing on said shaft around said armature and a field coil therein adjacent said armature, rotatably securing a wind turbine to said shaft, rotatably securing a brush plate with brushes thereon to said shaft, electrically connecting said field coil to said brushes, rigidly securing a pickup plate with electrical contacts on said shaft with said electrical contacts in engagement with said brushes, securing output lines to said electrical contacts, rigidly linking said wind turbine, and housing and said brush plate together, and mounting said shaft against rotation so that when air currents rotate said wind turbine, said housing, said field coil and said brush plate will rotate whereupon electrical current generated in said field coil will be transmitted to said output lines through said brushes and electrical contacts.

* * * * *